US012505306B2

(12) United States Patent
Geckt et al.

(10) Patent No.: US 12,505,306 B2
(45) Date of Patent: Dec. 23, 2025

(54) CATEGORIZING QUESTIONS FROM A TRANSCRIPT USING VECTOR EMBEDDINGS FOR INFORMATION RETRIEVAL

(71) Applicant: Microsoft Technology Licensing, LLC, Redmond, WA (US)

(72) Inventors: Dean Geckt, Haifa (IL); Abed El Kader Asi, Sammamish, WA (US); Royi Ronen, Tel Aviv (IL); Roy Eisenstadt, Tel Aviv (IL); Alexander Tsvetkov, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 163 days.

(21) Appl. No.: 18/307,724

(22) Filed: Apr. 26, 2023

(65) Prior Publication Data

US 2024/0362415 A1 Oct. 31, 2024

(51) Int. Cl.
*G06F 40/35* (2020.01)
*G06F 40/40* (2020.01)
*H04L 12/18* (2006.01)

(52) U.S. Cl.
CPC .............. *G06F 40/35* (2020.01); *G06F 40/40* (2020.01); *H04L 12/1831* (2013.01)

(58) Field of Classification Search
None
See application file for complete search history.

(56) References Cited

U.S. PATENT DOCUMENTS

2008/0120101 A1* 5/2008 Johnson .............. H04L 12/1822
704/E15.04
2014/0198174 A1* 7/2014 Sanso ...................... H04N 7/15
704/235

(Continued)

OTHER PUBLICATIONS

Hedstrom, Anna. "Question categorization for a question answering system using a vector space model." Master's thesis, Department of Linguistics and Philology (Language Technology Programme) Uppsala University, Uppsala, Sweden (2005). (Year: 2005).*

(Continued)

*Primary Examiner* — Douglas Godbold
(74) *Attorney, Agent, or Firm* — Barta Jones, PLLC

(57) ABSTRACT

A computerized method categorizes questions from a transcript and provides those categorized questions to targets. A transcript associated with a meeting is obtained and a question in the obtained transcript is detected by a question detection model. A question vector embedding of the detected question is generated using a question clustering model and a category of the detected question is determined by the question clustering model using the generated question vector embedding and a plurality of category vector embeddings. A target of the detected question is identified using the determined category and the detected question is provided to the identified target via a question provision interface. Further, the question clustering model is used to generate the category vector embeddings from example questions of category question catalogs, such that the set of categories for which the question clustering model is configured can be efficiently modified.

20 Claims, 7 Drawing Sheets

(56) References Cited

U.S. PATENT DOCUMENTS

| | | | |
|---|---|---|---|
| 2015/0220501 A1 | 8/2015 | Pickles et al. | |
| 2016/0027442 A1* | 1/2016 | Burton | G10L 15/26 |
| | | | 704/235 |
| 2016/0105566 A1* | 4/2016 | Klemm | H04M 3/565 |
| | | | 379/202.01 |
| 2017/0154264 A1* | 6/2017 | Chen | G06N 5/04 |
| 2018/0122383 A1* | 5/2018 | Raanani | H04M 3/5175 |
| 2018/0373696 A1* | 12/2018 | Terry | G06N 5/02 |
| 2019/0378502 A1* | 12/2019 | Bostick | G10L 15/1815 |
| 2019/0384813 A1* | 12/2019 | Mahmoud | G06F 40/289 |
| 2020/0177404 A1* | 6/2020 | Silva | G06Q 10/109 |
| 2020/0311738 A1* | 10/2020 | Gupta | G06F 16/22 |
| 2021/0097502 A1* | 4/2021 | Hilleli | G06N 3/045 |
| 2022/0028412 A1* | 1/2022 | Aher | G10L 25/51 |
| 2022/0207392 A1* | 6/2022 | Hou | G10L 15/26 |
| 2022/0383867 A1* | 12/2022 | Faulkner | G10L 15/16 |
| 2023/0033852 A1* | 2/2023 | Avrunin | H04N 7/155 |
| 2023/0136309 A1* | 5/2023 | Xiao-Devins | H04L 51/56 |
| | | | 705/7.13 |
| 2024/0037896 A1* | 2/2024 | Zhang | G06V 10/25 |
| 2024/0086639 A1* | 3/2024 | Jain | G10L 15/1815 |
| 2024/0095446 A1* | 3/2024 | Mane | G06F 40/216 |
| 2024/0153398 A1* | 5/2024 | Ji | G06F 40/30 |

OTHER PUBLICATIONS

International Search Report and Written Opinion received for PCT Application No. PCT/US2024/023485, Jul. 18, 2024, 13 pages.

Dias, et al., "View and understand call summary page in the Sales Hub app", Retrieved from: https://learn.microsoft.com/en-us/dynamics365/sales/view-and-understand-call-summary-sales-app#/highlights-tab, Jan. 25, 2023, 11 Pages.

Goldenberg, Olga, "Optimize sales conversation follow-ups in two easy steps", Retrieved from:, Jan. 19, 2023, 4 Pages.

International Preliminary Report on Patentability received for PCT Application No. PCT/US2024/023485, mailed on Nov. 6, 2025, 08 pages.

* cited by examiner

CATEGORIZING QUESTIONS FROM A TRANSCRIPT USING VECTOR EMBEDDINGS FOR INFORMATION RETRIEVAL

BACKGROUND

Meetings between multiple participants can be recorded and transcripts of such meetings can be generated. Meeting transcripts can then be used to review information and address questions or requests that arose during the meetings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for categorizing questions from a transcript and providing those categorized questions to targets is described. A transcript associated with a meeting is obtained and a question in the obtained transcript is detected by a question detection model. A question vector embedding of the detected question is generated using a question clustering model and a category of the detected question is determined by the question clustering model using the generated question vector embedding and a plurality of category vector embeddings. A target of the detected question is identified using the determined category and the detected question is provided to the identified target via a question provision interface.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Figure 1:
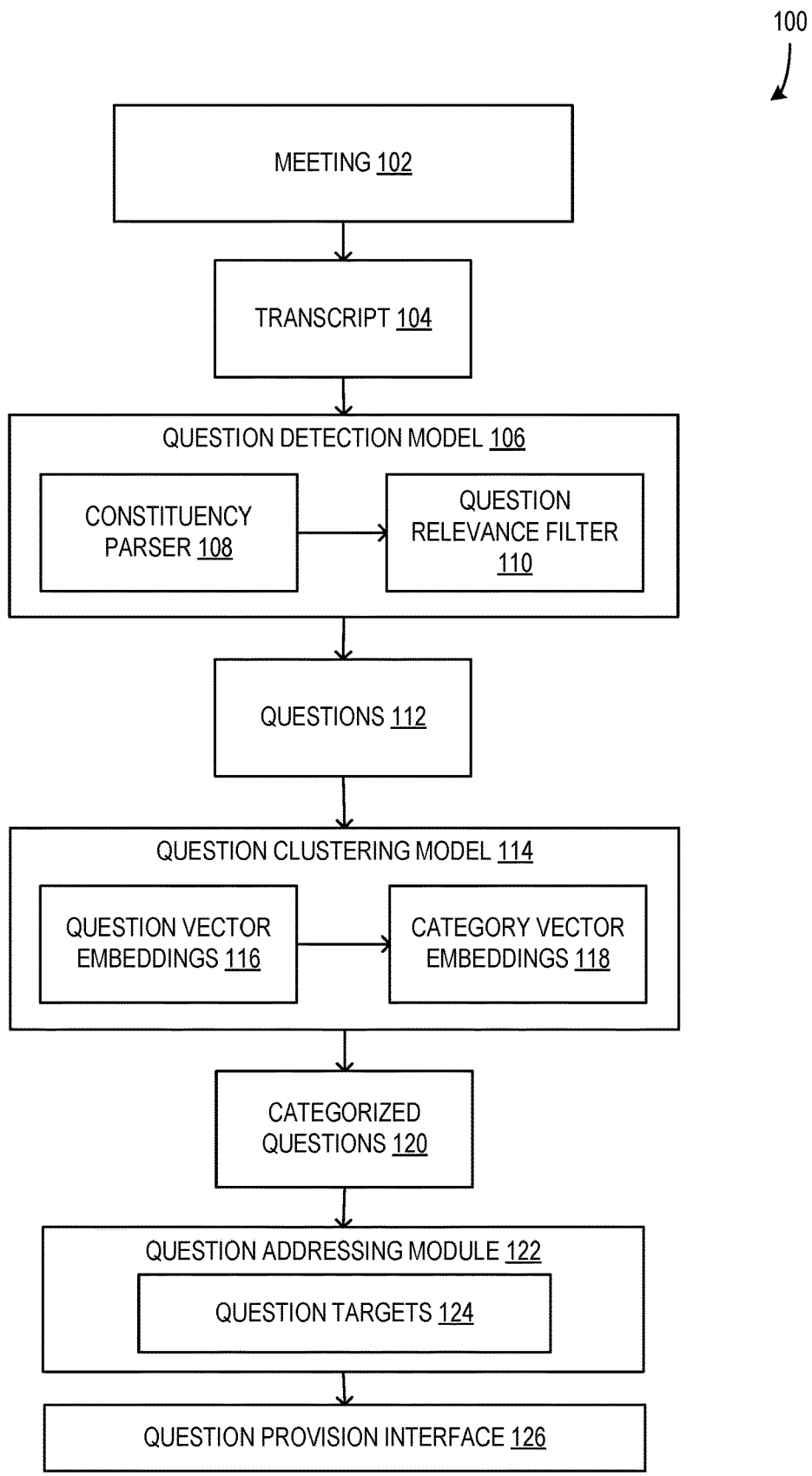
FIG. 1 is a block diagram illustrating an example system configured for categorizing questions and directing the questions to targets.

Aspects of the disclosure provide systems and methods for categorizing questions using a question clustering model and category vector embeddings. The disclosure is configured to analyze a transcript, such as of a meeting, using a question detection model. Questions detected by the question detection model are categorized, or clustered, using a question clustering model. The question clustering model is configured to identify a category that is the closest fit for each question in the vector embedding space of the model. To enable the categorized questions to be addressed, question targets for each question are determined and the questions are provided to those question targets using a question provision interface. The question provision interface is configured to display the question and, in some examples, other associated information. For example, the question provision interface includes a graphical user interface (GUI) that displays a question, a category of the question, a timestamp of the question with respect to the transcript, and/or a timestamp link that enables a user to view the portion of the transcript that includes the question.

The disclosure operates in an unconventional manner at least by comparing question vector embeddings to previously generated category vector embeddings. For example, the question clustering model includes an encoder portion that is configured to generate vector embeddings from input, where the vector embeddings include numerical values that represent semantic meaning of the input. The disclosure describes obtaining a category question catalog that includes a set or group of example category questions. A vector embedding is generated from each example category question in the category question catalog using the encoder of the question clustering model. The generated question vector embeddings are combined (e.g., by averaging values thereof) to form a category vector embedding that includes numerical values that represent a combined semantic meaning of questions of the category. This process is performed for each category which the disclosure will be configured to use during question categorization, such that a category vector embedding for each category is generated for, and used by, the question clustering model as described herein. This process enables the disclosure to automatically categorize questions with high accuracy while requiring relatively low levels of computing resource consumption to configure the associated question clustering model. Thus, a technical solution is provided to a technical problem.

Further, the use of the question clustering model enables the disclosure to be flexible, which reduces the computational burden on a device thereby improving the function of the device. The process of adding to or otherwise changing the set of categories for which the disclosure is configured is fast and requires a relatively small quantity of example category questions, especially when compared to training data requirements of some other machine learning-based systems. Thus, the use of computing system resources is reduced during configuration processes and/or customization processes.

Additionally, the question provision interface of the disclosure provides questions and associated information to the appropriate recipients in a dynamic and targeted way. The question provision interface is highly customizable and can be used to display a wide variety of information to different recipients, such that the questions and information provided can be made specific to the recipient. Thus, users of the disclosed system are enabled to quickly and efficiently review questions that were asked in a meeting and respond to those questions without wasting precious time and effort on reviewing other irrelevant portions of the meeting transcript. This provides an improved human machine interface, reducing the difficulty of a user interaction with a computing device.

FIG. 1 is a block diagram illustrating an example system 100 configured for categorizing questions 112 and directing the categorized questions 120 to targets 124. In some examples, the system 100 obtains or otherwise receives a transcript 104 associated with a meeting 102 or other similar event. The system uses a question detection model 106 to identify and/or extract a group of questions 112 from the transcript 104, wherein the group of questions 112 includes at least a subset of questions that were asked by participants during the meeting 102. A question clustering model 114 is used to categorize the group of questions 112 into categorized questions 120 and a question addressing module 122 is used to determine question targets 124 of each of the categorized questions 120. The categorized questions 120 are provided to question targets 124 using the question provision interface 126.

Further, in some examples, the system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, the system 100 is located on and/or executed on a single computing device. Alternatively, in some examples, entities of the system 100 are configured to be distributed between the multiple computing devices and to communicate with each other via network connections. For example, the question detection model 106 is executed on a first computing device and the question clustering model 114 is executed on a second computing device. In such an example, the first and second computing devices are configured to communicate with each other via a network connection. In other examples, other organizations of computing devices are used to implement the system 100 without departing from the description.

In some examples, the transcript 104 of the meeting 102 includes text data and/or data in another format. The data of the transcript 104 includes words, phrases, and/or other vocal expressions by one participant or multiple participants of the meeting 102. In some such examples, the transcript 104 is generated through analysis of audio information of the meeting 102 (e.g., an audio recording of the meeting 102 and/or live audio information analyzed during the meeting 102 in real time or near real time). Additionally, or alternatively, the transcript 104 is a multi-participant transcript that includes information that indicates and/or identifies speakers who have said or are saying portions of the text data of the transcript 104. For example, each phrase or portion of the transcript 104 includes a speaker label such as "Speaker 1" or "Speaker 2" that maps the phrase or portion of the transcript 104 to the identified speaker. In some other examples, the speaker labels that are applied to the portions of the text data include a specific name or other identifier of the speaker.

The question detection model 106 includes hardware, firmware, and/or software configured to detect questions within the data of the transcript 104 and to produce those questions as a group of question 112 as described herein. In some examples, the question detection model 106 includes a constituency parser 108 and/or a question relevance filter 110. The group of questions 112 generated by the question detection model 106 include text data and/or associated data (e.g., identifiers and/or indicators of the sources of the questions).

In some examples, the constituency parser 108 is configured to convert sentences, phrases, or other portions of the text data of the transcript 104 into tree formats (e.g., Penn Treebank format) with nodes and branches representing grammatical format of the converted text portions. For example, a sentence of the transcript 104 is converted into a tree that enables the sentence to be grammatically analyzed and/or evaluated to determine whether the sentence is a question. In some such examples, the constituency parser 108 is a model, such as a probabilistic parser, a shift-reduce parser, and/or a neural-network dependency parser. It should be understood that, in other examples, the question detection model 106 is configured to use other types of constituency parsers 108 without departing from the description.

The question relevance filter 110 is configured to determine whether a question that is identified by the constituency parser 108 is interesting, useful, and/or relevant. In some examples, the question relevance filter 110 primarily identifies and eliminates questions that are "not interesting" using logic that is defined to identify basic questions that occur during "small talk", often at the beginning of a meeting, such as "How are you?", "How was your weekend?", or the like. Alternatively, or additionally, the question relevance filter 110 filters out non-informative questions, such as questions or fragments of questions that do not include significant words associated with the call, but only "stop words" (e.g., "Why?", "How did?", or "Have I?"). In some examples, the set of "stop words" is a predefined list that is used by the question relevance filter 110 during evaluation of the questions identified by the constituency parser 108. It should be understood that, in some examples where an incomplete question fragment is identified due to incorrect or inaccurate generation of the transcript 104 or the like, the question relevance filter 110 is configured to filter out that incomplete question fragments from the group of questions 112 to avoid inaccurate question categorization and/or confusion of the question target 124 later.

The question clustering model 114 includes hardware, firmware, and/or software that is configured to analyze questions of the group of questions 112 and assign those analyzed questions to categories based on the analysis. In some examples, the question clustering model 114 generates question vector embeddings 116 and compares them to category vector embeddings 118. The category of the category vector embedding 118 to which a question vector embedding 116 most closely matches is the category to which the associated question is assigned. The generation of the category vector embeddings 118 is described in greater detail below with respect to FIG. 2.

In some examples, the question clustering model 114 includes a machine learning (ML)-trained language model that includes an encoder. For instance, in some examples, the question clustering model 114 is or otherwise includes a transformer model that is trained and configured to use self-attention mechanisms for natural language processing (NLP) tasks. In such examples, the transformer model includes an encoder for converting letters, words, and/or phrases of text into vector embeddings that represent the semantic meaning of the converted text. The encoder is used to generate a question vector embedding 116 for each question of the group of questions 112. A question vector embedding 116 is a data structure that includes a set or group of numerical values representing dimensions of the vector. For instance, in an example, a question vector embedding is represented as $(D_1, D_2, D_3, \ldots, D_n)$, where $D_1, D_2, D_3,$ and $D_n$ represent numerical values of the question vector embedding for each dimension of the question vector embedding, up to n dimensions. Such numerical values represent coordinate values in an n-dimensional space or distances from a zero point in each dimension of the n-dimensional space. As an example, a two-dimensional question vector embedding has two numerical values, x and y, that represent coordinates on a two-dimensional plane, with x being associated with the horizontal dimension and y being associated with the vertical dimension. In such an example, if x and y values are defined to be representative of the semantic meaning of some input text, then texts with similar semantic meanings would result in vector embeddings located in similar regions of the two-dimensional plane, while texts with very different semantic meanings would result in vector embeddings located in different regions of the two-dimensional plane. It should be understood that, in most examples, the quantity of numerical values in the question vector embeddings used in the described systems and methods is greater than two (e.g., 50 numerical values, 100 numerical values, or 300 numerical values).

In generating a question vector embedding 116, the encoder generates numerical values for each position or dimension in the set that represent semantic meaning of the question from which the question vector embedding 116 is generated. Thus, the semantic meaning that is represented by a question vector embedding 116 can be compared to the semantic meaning of another question vector embedding 116 by comparing the numerical values in both question vector embeddings 116. In some examples, the comparison includes determining differences between each pair of corresponding numerical values in the two question vector embeddings 116. Additionally, or alternatively, other methods of comparison are used. For example, two question vector embeddings 116 or a question vector embedding 116 and a category vector embedding 118 are compared to each other using cosine similarity. Cosine similarity uses the cosine of the angle between the vectors being compared to determine their similarity. Calculating the cosine similarity can be done by calculating the dot product of the vectors and dividing the result by the product of the lengths of the vectors. Cosine similarity provides an output value between negative one and positive one, with vectors that are similar producing output values that approach one, vectors that are orthogonal producing output values that are zero, and vectors that are opposite producing output values of negative one. Using cosine similarity is advantageous in some examples because its calculation is relatively low complexity and only non-zero values of the two vectors are considered. Questions that are more semantically similar will have question vector embeddings that are closer together within the vector space, or that have more similar numerical values.

The question clustering model 114 includes the set of category vector embeddings 118, which are vector embeddings that reflect an average semantic meaning of questions that belong to that category. In some examples, the set of category vector embeddings 118 includes a category vector embedding 118 for each category in a group or list of pre-defined categories (e.g., pre-defined categories for which a category vector embedding 118 has been generated as described herein). A question vector embedding 116 is compared to each of the category vector embeddings 118, and the associated question is assigned to the category for which the category vector embedding 118 is most similar to the question vector embedding 116. When this comparison and assignment is done for each question in the group of questions 112, the categorized questions 120 are formed as output of the question clustering model 114.

It should be understood that, in some examples, the question clustering model 114 includes a language model that has been fine-tuned to categorize questions into specific categories by using ML techniques and a curated catalog of categorized question training data. In some such examples, the fine-tuned language model is trained to generate the assigned category of an input question without the specific step of comparing a vector embedding of the question to a vector embedding of the category. In other examples, other methods of assigning questions to categories are used without departing from the description.

Further, in some examples, the question clustering model 114 and associated parts of the system 100 can be extended or enhanced to add additional categories and/or improve or enrich existing categories through adding to and/or otherwise modifying the category catalogs that are used with the question clustering model 114. This is described in greater detail herein with respect to FIG. 2.

Additionally, or alternatively, in some examples, categories assigned to questions are treated as labels, such that a question can be assigned more than one category label. In such examples, rather than assigning the question to the category with which the question best matches as described above, a question is assigned one or more category labels based on the similarities between the associated question vector embedding and one or more of the category vector embeddings 118 exceeding a defined threshold. For instance, in an example, if the cosine similarity value of a question vector embedding 116 and a category vector embedding 118 meets or exceeds 0.70, the associated question is assigned to the associated category, regardless of whether the question has already been assigned to another category. In this way, questions can be assigned to multiple categories using category labels, enabling greater flexibility in the sorting of and/or clustering of questions 112 from the transcript 104.

The question addressing module 122 includes hardware, firmware, and/or software configured to identify a question target or targets 124 of a categorized question 120. In some examples, the question addressing module 122 determines a question target 124 of a categorized question 120 based on the category of the categorized question 120. For instance, in an example, the category to which a categorized question 120 is assigned or specifically associated with a particular department in an organization. The question addressing module 122 determines a representative of that department that was present at the meeting 102 or that otherwise represents the department, and selects that representative as the question target 124. Further, in some examples, the question addressing module 122 uses data from the transcript 104 to determine the target 124 of a categorized question 120. For example, the transcript 104 identifies a speaker or source of the question using a label as described above and there are only two participants in the meeting, so the question target 124 is determined to be the participant that was not identified as the speaker or source of the question. In another example, the question text includes a person's name, indicating that the speaker of the question was directly asking the person who was named. The question addressing module 122 uses the name in the question to map the question to or otherwise determine the question target 124.

Additionally, or alternatively, in some examples, the question addressing module 122 determines a question target 124 for a categorized question 120 based on participation in the meeting 102 from the transcript 104. For example, a question target 124 associated with a question from a particular portion of the transcript 104 is determined based on identifying the meeting participant that spoke the most during that part of the transcript. In such meetings, if one person is the presenter providing information to the participants of the meeting and some of the participants interject to ask questions, then those questions should be targeted at the presenter, thus making that presenter the most likely question target 124 for a question during that portion of the meeting 102.

The question provision interface 126 includes hardware, firmware, and/or software configured to display and/or otherwise provide categorized questions 120 and/or information associated therewith to the identified question targets 124 or other parties. In some examples, the question provision interface 126 includes a graphical user interface (GUI). Alternatively, or additionally, the question provision interface 126 includes other types of interfaces, such as text-based interfaces, audio-based interfaces, interfaces that rely on email or other communication formats, or the like. Example features of the question provision interface 126 are described in greater detail below with respect to FIG. 4.

In some examples, the question provision interface 126 provides categorized questions 120 to a question target 124 in a group, enabling the question target 124 to view the questions outside of the transcript 104. The text of the questions 120 is provided to the question target 124 and, in some examples, other information associated with the questions 120 is also provided. In some examples, the question provision interface 126 provides timestamps associated with the occurrence of the questions 120 during the meeting 102 and/or in the transcript 104. Further, the question provision interface 126 provides the categories of the questions 120 and/or groups the questions 120 by assigned categories. In still other examples, the question provision interface 126 enables a question target 124 to view tasks that are likely to result from the questions 120 asked and/or provides the question target 124 with template responses to one or more of the questions 120. In other examples, other types of information are provided to question targets 124 by the question provision interface 126 without departing from the description.

Figure 2:
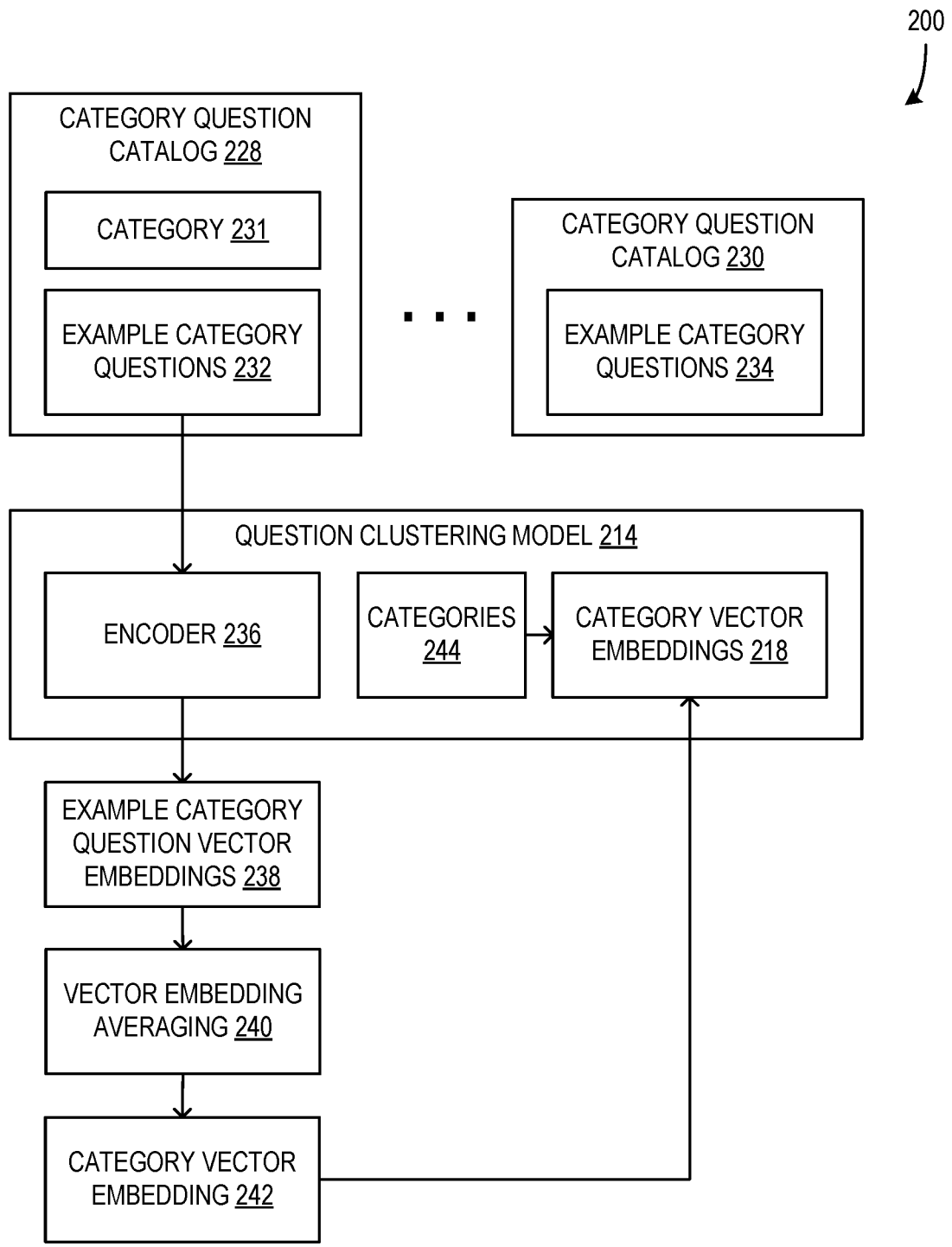
FIG. 2 is a block diagram illustrating an example system configured for generating category vector embeddings.

FIG. 2 is a block diagram illustrating an example system 200 configured for generating category vector embeddings 218. In some examples, the system 200 is part of or otherwise associated with a system such as system 100 of FIG. 1. Further, it should be understood that the system 200 generates the category vector embeddings 218 to enable the question clustering model 214 to categorize questions as described above with respect to question clustering model 114 of FIG. 1.

In some examples, category question catalogs 228-230 are defined to include example category questions 232-234, respectively. For each category for which the question clustering model 214 is being configured, a category question catalog 228-230 is defined. For example, the category question catalog 228 is defined for a first category and the category question catalog 230 is defined for a second category. In other examples, more and/or different category question catalogs are defined without departing from the description.

The example category questions 232-234 of the category question catalogs 228-230 are defined to be representative of questions that should be assigned to the associated category (e.g., category 231). For instance, if the category question catalog 228 is defined to represent a budget category 231, the example category questions 232 include questions that are specifically about budget topics or otherwise related to the budget category 231. In some examples, the example category questions 232 are manually generated or defined by a user. Alternatively, or additionally, the example category questions 232 include real questions asked during past meetings that have been manually categorized by a user that has reviewed those real questions. Furthermore, example category questions 232 may be generated automatically using a question generation model or other automated process without departing from the description.

The question clustering model 214 includes an encoder 236. The encoder 236 includes hardware, firmware, and/or software configured to generate vector embeddings from text data of questions provided as input. The generated question vector embeddings include groups, sets, or lists of numerical values that are representative of semantic meaning of the input question, as described above. In some examples, the encoder 236 has been trained using machine learning techniques to generate vector embeddings that accurately represent semantic meanings of input questions to a satisfactory degree.

The encoder 236 is used to generate the category vector embeddings 218 that are used by the question clustering model 214 for categorizing questions as described herein. For instance, to generate a category vector embedding 218 for a category 231, the category question catalog 228 associated with the category 231 is used with the encoder 236. Each example category question 232 of the category question catalog 228 is provided as input to the encoder 236 to generate example category question vector embeddings 238. There is an example category question vector embedding 238 generated for each example category question 232 of the category question catalog 228.

The example category question vector embeddings 238 are combined using vector embedding averaging 240 to generate the category vector embedding 242, which is added to the group of category vector embeddings 218. The question clustering model 214 includes one category vector embedding 218 for each category 244 to which the question clustering model 214 is configured to assign questions, in some examples. Thus, the question clustering model 214 is configured to assign an input question to one category 244 of the categories 244 based on the category vector embeddings 218, as described herein at least with respect to the system 100 of FIG. 1. It should be understood that, in some examples, the question clustering model 214 and systems that use it are configured to be extensible, such that a customer or other entity is enabled to provide their own category question catalogs 228-230 for their own categories 231. These category question catalogs 228-230 are then analyzed as described herein to generate the associated category vector embeddings 218, thus configuring the question clustering model 214 to assign questions to the associated categories 231. This enables a customer or other entity to add to or otherwise change the set of categories for which the question clustering model 214 is configured.

Figure 3:
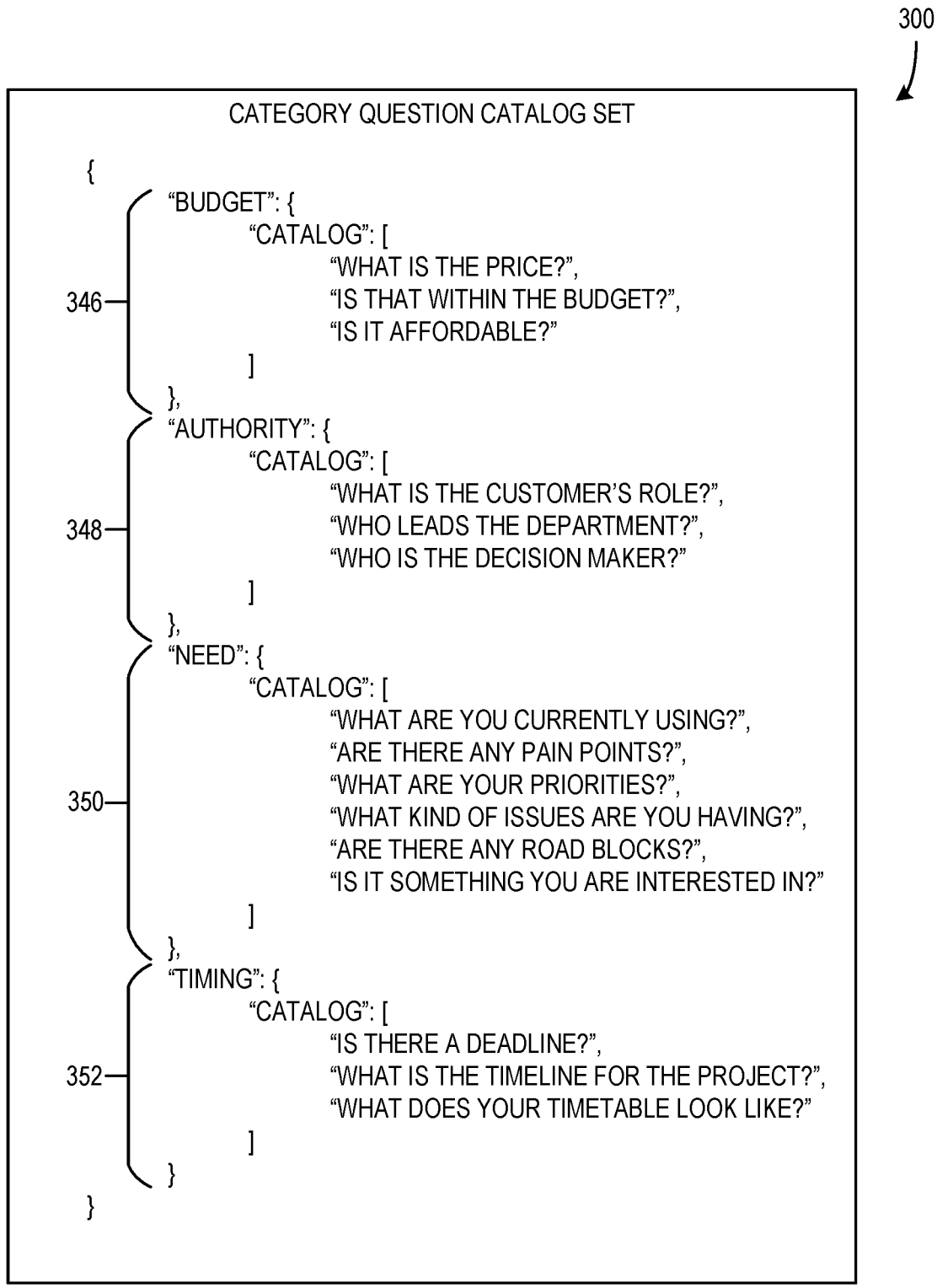
FIG. 3 is a diagram illustrating an example set of category question catalogs.

FIG. 3 is a diagram illustrating an example set of category question catalogs 300. In some examples, the category question catalog set 300 includes category question catalogs such as the category question catalogs 228-230 as described above with respect to FIG. 2.

The category question catalog set 300 includes category question catalogs 346, 348, 350, and 352. Category question catalog 346 is associated with a "budget" category and includes three questions that are associated with budget topics. Category question catalog 348 is associated with an "authority" category and includes three questions that are associated with authority topics (e.g., questions to determine which parties have the authority to take actions). Category question catalog 350 is associated with a "need" category and includes six questions that are associated with need topics (e.g., questions to determine what a customer's needs are). Category question catalog 352 is associated with a "timing" category and includes three questions associated with timing topics.

It should be understood that, in other examples, the category question catalog set 300 includes more, fewer, and/or different category question catalogs associated with more, fewer, and/or different categories without departing from the description. Further, in other example, the category question catalogs of the category question catalog set 300 include more, fewer, and/or different questions without departing from the description.

Figure 4A:
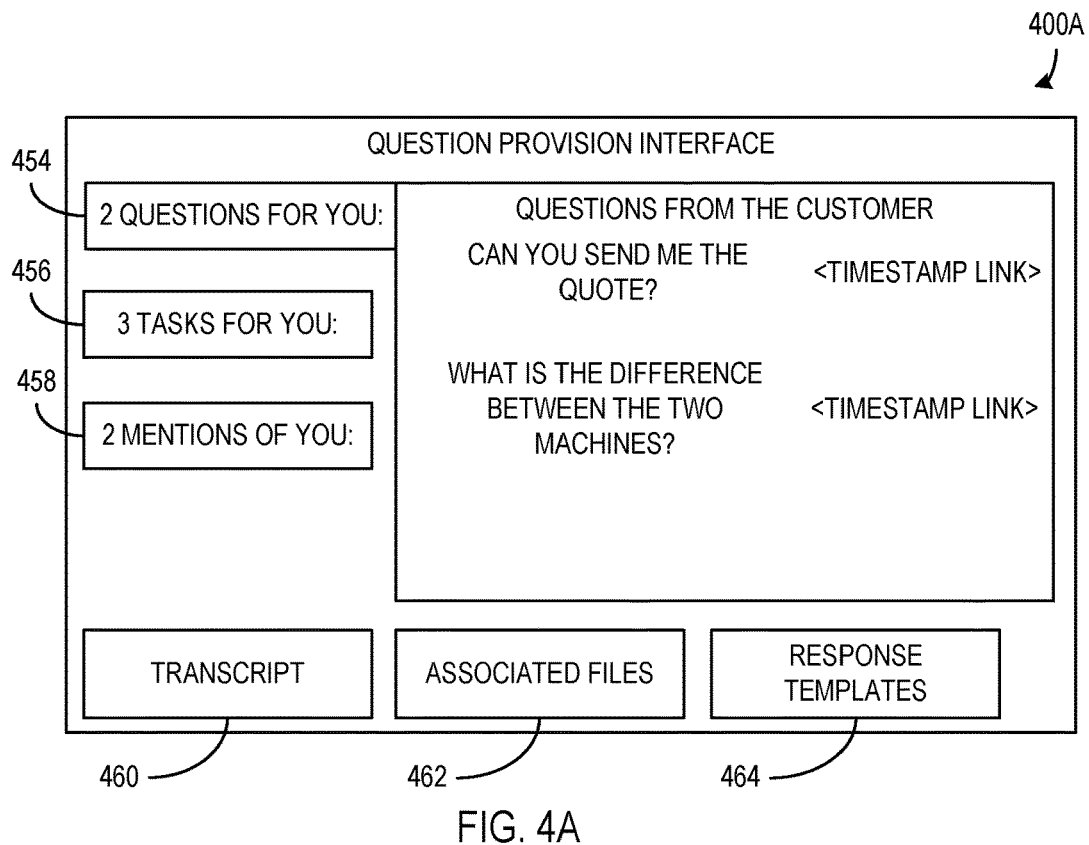
FIGS. 4A-B are diagrams illustrating example question provision interfaces configured to provide questions and associated information to question targets.
Figure 4B:
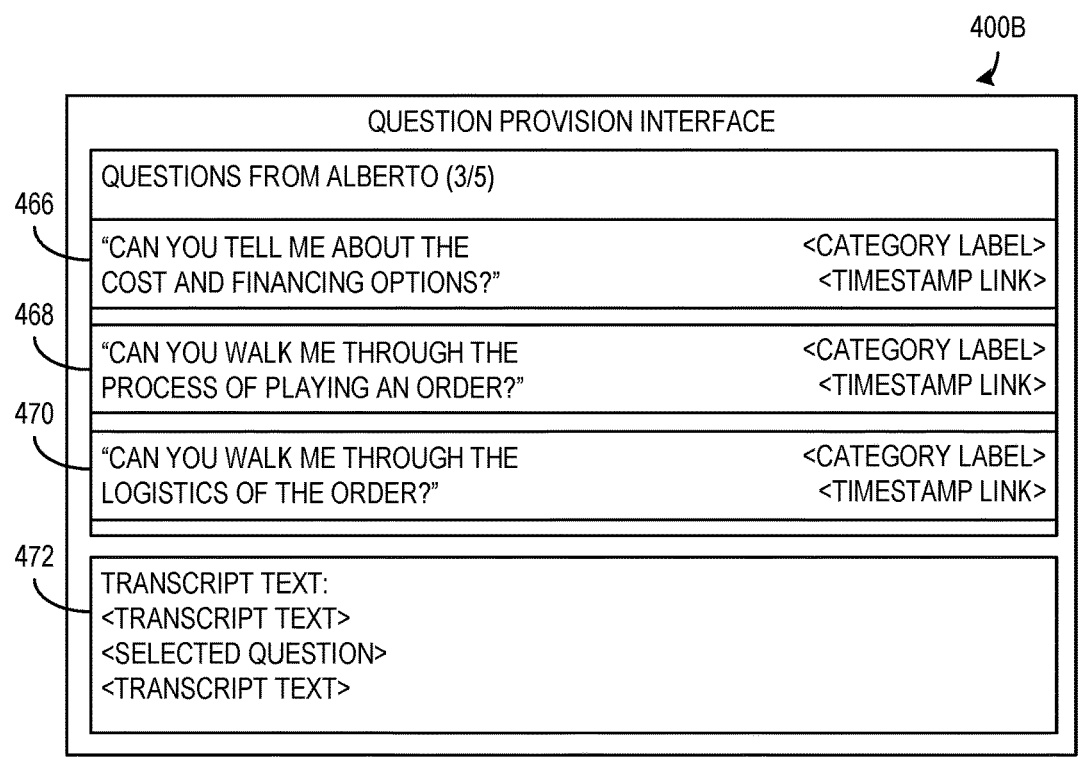

FIGS. 4A-B are diagrams illustrating example question provision interfaces 400A and 400B configured to provide questions (e.g., categorized questions 120) and associated information to question targets (e.g., question targets 124). In some examples, the question provision interfaces 400A and/or 400B are part of or otherwise associated with a system such as system 100 of FIG. 1. For example, the question provision interface 400A is included as at least part of the question provision interface 126 of system 100 as described above.

In FIG. 4A, the question provision interface 400A is a graphical user interface (GUI) that includes several sub-interfaces for displaying questions and associated information. The sub-interface 454 displays questions for the user (e.g., the question target 124 of the questions) of the interface when selected. As illustrated, the sub-interface 454 is selected and, as a result, two questions for the current user from the customer are displayed. Each question includes a timestamp link that enables the user to view the transcript portion in which the question is posed. This enables the user to view additional contextual information associated with the question. Additionally, or alternatively, the timestamp link enables the user to listen to an audio recording and/or view a video recording of the portion of the meeting during which the question was posed.

The sub-interface 456 displays a quantity of tasks for the current user that have been determined from the questions asked and/or other associated information from the transcript. When selected, the sub-interface 456 causes the area to the right to display specific information about the three tasks for the user. In some examples, tasks include actions that the user may be prompted to perform after the meeting. Such tasks are manually assigned by other users based on questions directed at the current user, manually noted as tasks by the current user, and/or automatically derived by the system 100 based on the questions that are targeted at the current user. For example, questions targeted at the current user include "Could you please provide that report after the meeting?". This question is identified and categorized as a task question, which is then provided to the question target as a task displayed via the sub-interface 456.

The sub-interface 458 displays a quantity of mentions of the current user that have been determined from questions asked and/or other associated information from the transcript. In some examples, mentions include instances where the current user was mentioned in asked questions in the transcript, but the current user is not found to be the target of those asked questions. Thus, the current user is notified that they have been mentioned in a question, even though the question was not specifically directed to them. When the sub-interface 458 is activated, the questions in which the current user was mentioned are displayed in a similar format as the questions of sub-interface 454, enabling the current user to view the questions and gain additional information about the questions from timestamp links to the transcript and/or recordings of the meeting.

The interface 400A further includes a transcript button 460. When activated, the transcript button 460 enables the current user to access the transcript of the meeting. The user is enabled to view the entire transcript, look up specific portions of the transcript, or the like. Further, the interface 400A includes an associated files button 462. When activated, the associated files button 462 enables the user to access any files that are associated with the transcript and/or meeting (e.g., a file that was attached to a digital representation of the meeting, such as a slide deck or other file presented during the meeting). Additionally, the interface 400A includes a response templates button 464. When activated, the response templates button 464 enables the user to access predefined response templates to questions. In some examples, such response templates are specific to categories (e.g., a response template that is specific to responding to budget questions including prompts for common information that is included in responses to budget questions generally).

In FIG. 4B, the question provision interface 400B is a GUI that includes a list of questions from a meeting participant, Alberto, and directed to the current user. The questions 466, 468, and 470) are displayed to the current user and the category label of each question is displayed, giving the current user some context information associated with each question. Further, the timestamp links of each question are provided, enabling the user to access a portion of the transcript and/or recording of the meeting that includes the associated question. As illustrated, a timestamp link of one of the questions 466-470 has been selected and the transcript text of the associated transcript portion is displayed in the interface section 472.

In other examples, the question provision interfaces 400A and/or 400B are configured to display or otherwise provide more, less, or different information associated with categorized questions without departing from the description.

In an example, the question provision interfaces 400A and/or 400B are configured to enable a user to search through questions being asked, cluster questions by category, and/or skip through or past some categories to access questions of other categories. For instance, the sub-interfaces 454-458 of the interface 400A include a sub-interface for each category of question that the user has been asked, such that the user is enabled to select the sub-interface associated with a category for which the user wants to view questions.

Figure 5:
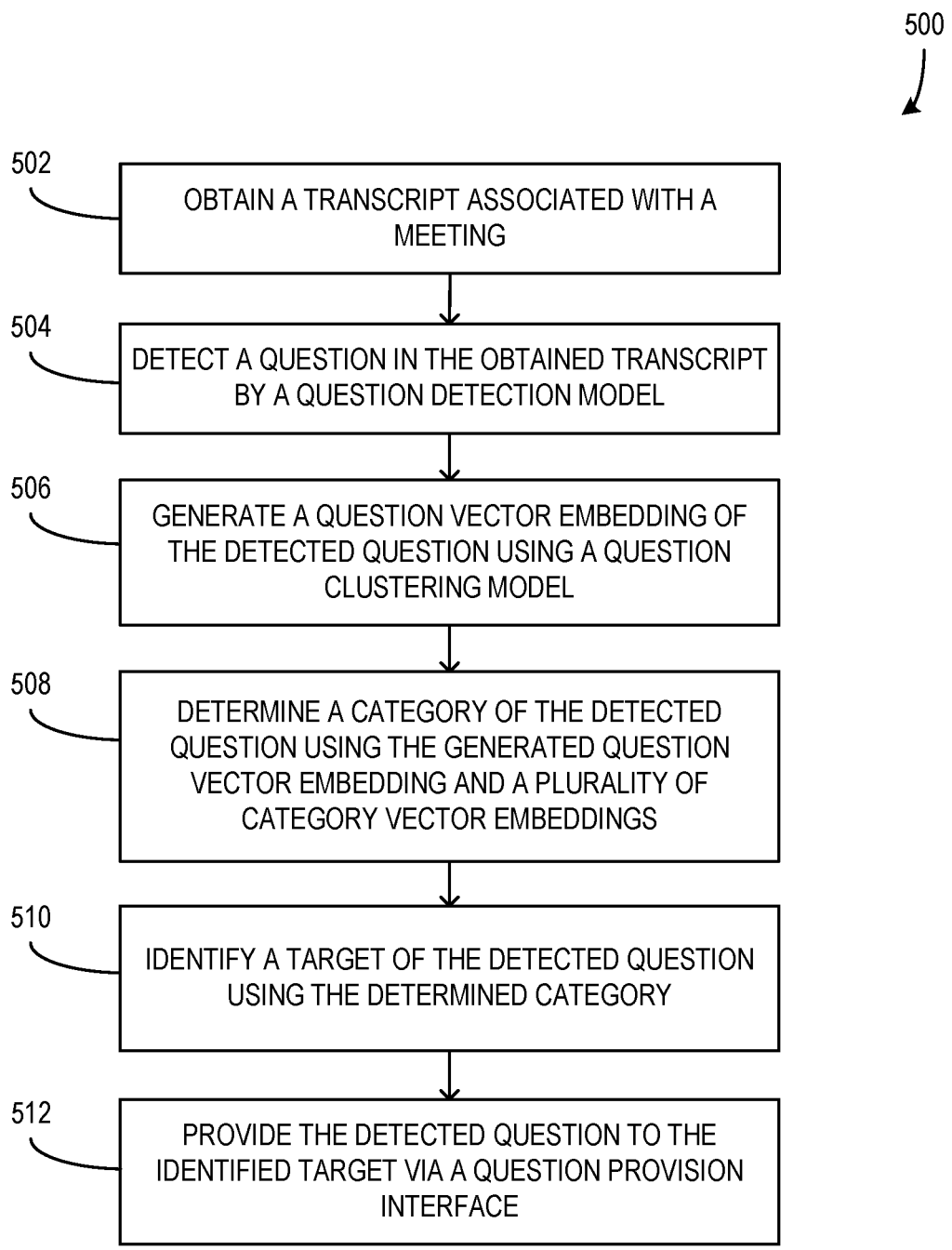
FIG. 5 is a flowchart illustrating an example method for categorizing questions of a transcript and providing the categorized questions to question targets.

FIG. 5 is a flowchart illustrating an example method 500 for categorizing questions (e.g., questions 112) of a transcript (e.g., transcript 104) and providing the categorized questions (e.g., categorized questions 120) to question targets (e.g., question targets 124). In some examples, the method is executed or otherwise performed by a system such as system 100 of FIG. 1.

At 502, a transcript associated with a meeting is obtained. In some examples, the transcript is obtained from a system configured to generate text data transcripts from audio data of the meeting. Alternatively, or additionally, the transcript is obtained from a manual transcription service or some combination of automated and manual transcript generation. Further, in some examples, the transcript includes text data representing words, phrases, and/or sentences spoken by participants of the meeting and/or data indicating which participants are speaking during instances of time of the meeting.

At 504, a question is detected in the obtained transcript by a question detection model. In some examples, the question detection model is used to detect a plurality of questions in the transcript. Further, in some examples, the question detection model is configured to detect questions in the transcript based on grammatical structure using a parser, such as a constituency parser 108. Additionally, or alternatively, in addition to detecting questions in the transcript, the detected questions are filtered using a question relevance filter 110 as described herein. For example, the question relevance filter 110 is configured to identify questions that include only "stop words" from a defined list of "stop words" and remove those identified questions from the plurality of detected questions. In other examples, more, fewer, or different methods are used to filter the detected questions without departing from the description.

At 506, a question vector embedding of the detected question is generated using a question clustering model. In some examples, the question vector embedding is generated using an encoder portion (e.g., encoder 236) of the question clustering model, such that the generated question vector embedding includes a group or list of numerical values that represent semantic meaning of the detected question as described herein.

At 508, a category of the detected question is determined using the generated question vector embedding and a plurality of category vector embeddings. In some examples, the category is determined by comparing the generated question vector embedding to each category vector embedding of the plurality of category vector embeddings. For example, the embeddings are compared using a cosine similarity technique. A category vector embedding is found to be the most similar to the question vector embedding, and the category of that category vector embedding is determined to be the category of the detected question.

At 510, a target of the detected question is identified using the determined category. In some examples, a user or other entity is found to be associated with the determined category and that user or other entity (e.g., a computing device or other device, an application being executed on a computing device, or the like) is identified as the target of the detected question as a result. For example, a department is determined to be responsible for or otherwise associated with the category of the detected question. A member of the determined department, such as the head of the department, is identified as the target of the detected question based on the member's association with the department. Additionally, or alternatively, other data, such as data from the transcript and/or a recording of the meeting, is used to identify a target of the detected question. For example, the text of the detected question includes the name of a meeting participant to which the question was directed during the meeting. The name is then used to identify the target of the detected question at 510. In other examples, more and/or different methods are used with the determined category to identify a target of the detected question without departing from the description.

At 512, the detected question is provided to the identified target via a question provision interface (e.g., question provision interface 126). In some examples, the question provision interface includes a GUI, such as the interfaces 400A and 400B of FIGS. 4A and 4B, respectively. Further, in some examples, the detected question is provided to the identified target along with additional information associated with the detected question, such as the determined category of the question and/or a timestamp of the question with respect to the transcript. Additionally, or alternatively, providing the detected question via the question provision interface includes displaying the detected question in a GUI, indicating a source of the detected question, providing a timestamp of the detected question with respect to the obtained transcript, enabling the identified target of the detected question to view a portion of the obtained transcript associated with the detected question, indicating the determined category of the detected question, and providing a plurality of questions to the identified target of the detected question.

Figure 6:
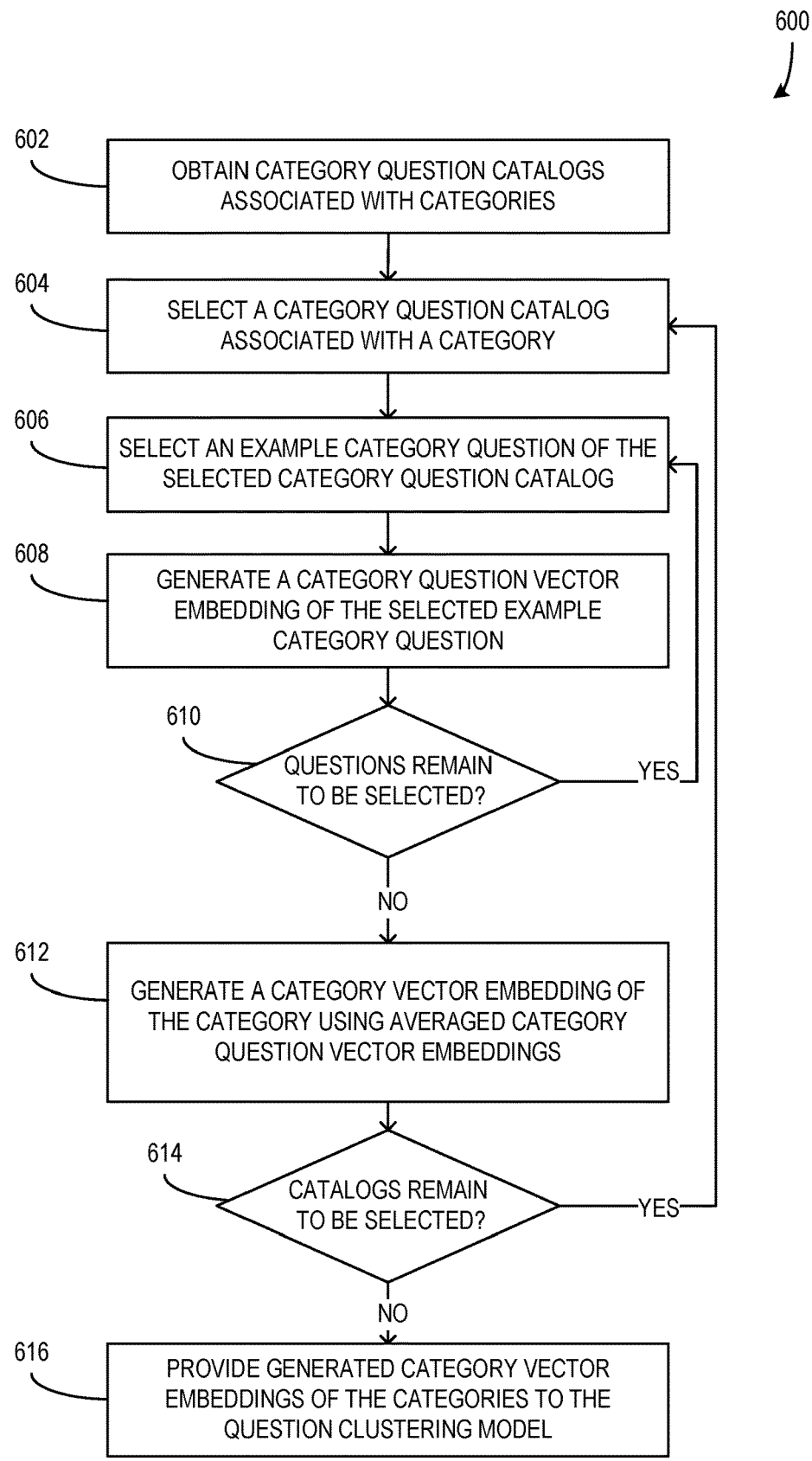
FIG. 6 is a flowchart illustrating an example method for generating category vector embeddings for use by a question clustering model.

FIG. 6 is a flowchart illustrating an example method 600 for generating category vector embeddings (e.g., category vector embeddings 218) for use by a question clustering model (e.g., question clustering model 214). In some examples, the method 600 is executed or otherwise performed by a system such as system 200 of FIG. 2.

At 602, category question catalogs associated with categories are obtained. In some examples, the category question catalogs are manually generated and provided. Alternatively, or additionally, the questions of the category question catalogs are obtained from existing meeting transcripts and are manually or automatically divided or otherwise arranged in the multiple category question catalogs associated with the multiple categories.

At 604, a category question catalog associated with a category is selected and, at 606, an example category question of the selected category question catalog is selected.

At 608, a category question vector embedding of the selected example category question is generated. In some examples, the category question embedding is generated using an encoder portion of the question clustering model as described herein at least with respect to FIG. 2.

At 610, if questions remain in the selected category question catalog to be selected, the process returns to 606. Alternatively, if there are no questions left to be selected in the selected category question catalog, the process proceeds to 612.

At 612, a category vector embedding of the category is generated using averaged category question vector embeddings. In some examples, the averaging of the category question vector embeddings includes averaging numerical values in each dimension of each vector, such that the resulting category vector embedding includes an average numerical value in each dimension, and the quantity of dimensions in the category vector embedding is the same as the quantity of dimensions in each of the category question vector embeddings. For instance, in an example, a category has three example category questions for which three category question embeddings have been generated. The category question embeddings have three numerical values associated with three dimensions. To calculate the numerical value associated with the first dimension of the category vector embedding, the first numerical values of each of the three category question embeddings are added together and divided by three. The resulting value is the average numerical value of the first dimension for the three category question embeddings and, thus, it is the numerical value of the first dimension of the category question embeddings. Similarly, the second numerical values of each of the category question embeddings are added together and divided by three, and the third numerical values of each of the category questions are added together and divided by three, forming the numerical values of the second and third dimensions of the category vector embedding, respectively.

While averaging is described as the operation for processing the category question vector embeddings in some examples, in other examples other operations are contemplated. For example, the operation could be to identify the median, or use a weighted average where the weights vary based on criteria such as length of the question, category or type of the question, language used, and the like.

At 614, if catalogs remain to be selected, the process returns to 604. Alternatively, if there are no catalogs left to be selected in the obtained group of category question catalogs, the process proceeds to 616.

At 616, the generated category vector embeddings of the categories are provided to the question clustering model. These generated category vector embeddings enable the question clustering model to categorize questions based on comparing question vector embeddings to each of the category vector embeddings as described herein.

Exemplary Operating Environment

Figure 7:
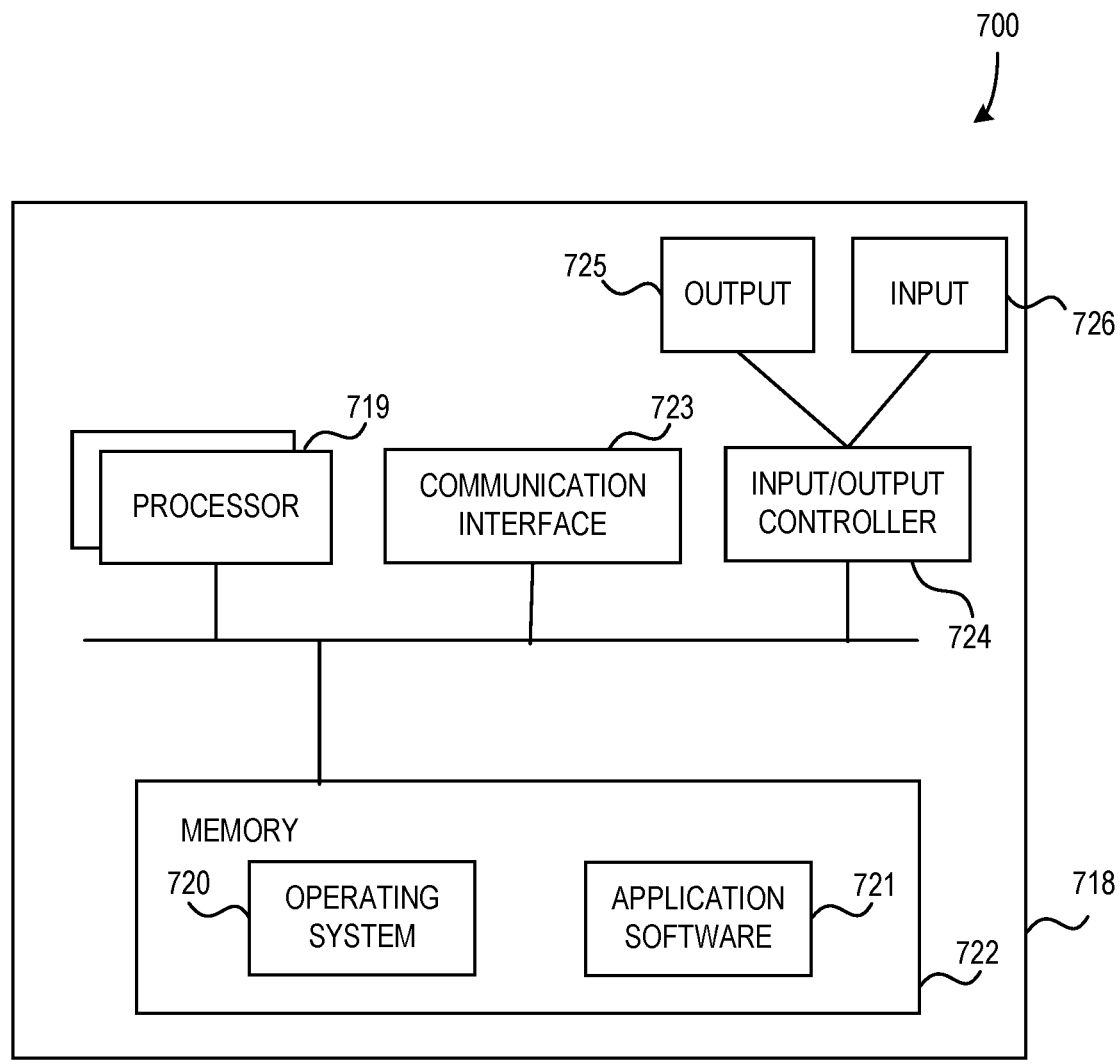
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, using models to categorize questions from transcripts and provide those questions to targets as described herein is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to: obtain a transcript associated with a meeting; detect, by a question detection model, a question in the obtained transcript; generate, using a question clustering model, a question vector embedding of the detected question; determine, by the question clustering model, a category of the detected question using the generated question vector embedding and a plurality of category vector embeddings; identify a target of the detected question using the determined category; and provide the detected question to the identified target via a question provision interface.

An example computerized method comprises: obtaining a transcript associated with a meeting; detecting, by a question detection model, a plurality of questions in the obtained transcript; filtering the plurality of questions using a question relevance filter; generating, using a question clustering model, a question vector embedding of a selected question of the filtered plurality of questions; determining, by the question clustering model, a category of the selected question using the generated question vector embedding and a plurality of category vector embeddings; identifying a target of the selected question using the determined category; and providing the selected question to the identified target via a question provision interface.

One or more computer storage media have computer-executable instructions that, upon execution by a processor, cause the processor to at least: obtain a category question catalog associated with a category, wherein the obtained category question catalog includes a plurality of example category questions; generate, using a question clustering model, a plurality of category question vector embeddings from the plurality of example category questions of the obtained category question catalog; generate a category vector embedding associated with the category using the generated plurality of category question vector embeddings; and include the generated category vector embedding in a plurality of category vector embeddings associated with the question clustering model.

Alternatively, or in addition to the other examples described herein, examples include any combination of the following:

wherein the memory and the computer program code are configured to cause the processor to: detect, by the question detection model, a plurality of questions in the obtained transcript, wherein the detected question is part of the detected plurality of questions; filter the plurality of questions using a question relevance filter; generate, using the question clustering model, a plurality of question vector embeddings of the filtered plurality of questions, wherein the generated question vector embedding of the detected question is part of the generated plurality of question vector embeddings of the filtered plurality of questions; determine, by the question clustering model, a plurality of categories of the filtered plurality of questions using the generated plurality of question vector embeddings and the plurality of category vector embeddings; identify a plurality of targets of the filtered plurality of questions using the determined plurality of categories; and provide the filtered plurality of questions to the identified plurality of targets via the question provision interface.

wherein the question relevance filter includes filtering logic for removing questions from the detected plurality of questions that include only words that are present on a list of stop words.

wherein detecting the question in the obtained transcript includes detecting an identity of a speaker who asked the detected question; and wherein identifying the target of the detected question includes identifying the target of the detected question using the detected identity of the speaker.

wherein providing the detected question to the identified target via a question provision interface includes one or more of the following: displaying the detected question in a graphical user interface (GUI), indicating a source of the detected question, providing a timestamp of the detected question with respect to the obtained transcript, enabling the identified target of the detected question to view a portion of the obtained transcript associated with the detected question, indicating the determined category of the detected question, and providing a plurality of questions to the identified target of the detected question.

wherein identifying the target of the detected question using the determined category includes: determining a department associated with the determined category; and identifying a member of the determined department as the target of the detected question.

wherein the memory and the computer program code are configured to cause the processor to: obtain a category question catalog associated with the determined category prior to obtaining the transcript associated with the meeting, wherein the obtained category question catalog includes a plurality of example category questions; generate, using the question clustering model, a plurality of category question vector embeddings from the plurality of example category questions of the obtained category question catalog; generate a category vector embedding associated with the category using the generated plurality of category question vector embeddings; and include the generated category vector embedding in the plurality of category vector embeddings used by the question clustering model.

wherein determining, by the question clustering model, the category of the detected question using the generated question vector embedding and a plurality of category vector embeddings includes: comparing the generated question vector embedding to each category vector embedding of the plurality of category vector embeddings using cosine similarity; determining a category vector embedding of the plurality of category vector embeddings that is most similar to the generated question vector embedding; and assigning a category of the determined category vector embedding as the category of the detected question.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a transcript associated with a meeting; exemplary means for detecting, by a question detection model, a question in the obtained transcript; exemplary means for generating, using a question clustering model, a question vector embedding of the detected question; exemplary means for determining, by the question clustering model, a category of the detected question using the generated question vector embedding and a plurality of category vector embeddings; exemplary means for identifying a target of the detected question using the determined category; and exemplary means for providing the detected question to the identified target via a question provision interface.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to cause the processor to:
obtain a transcript associated with a meeting;
detect, by a question detection model, a question in the obtained transcript;
generate, using a question clustering model, a question vector embedding of the detected question;
determine, by the question clustering model, a category of the detected question using the generated question vector embedding, wherein question vector embeddings having similar semantic meanings are located in similar regions in an n-dimensional space;
compare the category of the detected question to a plurality of category vector embeddings and determine a closest matching category;
identify a target of the detected question using the determined closest matching category; and
provide the detected question to the identified target via a question provision interface.

2. The system of claim 1, wherein the memory and the computer program code are configured to cause the processor to:
detect, by the question detection model, a plurality of questions in the obtained transcript, wherein the detected question is part of the detected plurality of questions;
filter the plurality of questions using a question relevance filter;
generate, using the question clustering model, a plurality of question vector embeddings of the filtered plurality of questions, wherein the generated question vector embedding of the detected question is part of the generated plurality of question vector embeddings of the filtered plurality of questions;
determine, by the question clustering model, a plurality of categories of the filtered plurality of questions using the generated plurality of question vector embeddings and the plurality of category vector embeddings;
identify a plurality of targets of the filtered plurality of questions using the determined plurality of categories; and
provide the filtered plurality of questions to the identified plurality of targets via the question provision interface.

3. The system of claim 1, wherein a question relevance filter is included in the question detection model, the question relevance filter filtering out insignificant words in the transcript.

4. The system of claim 1, wherein the question clustering model includes a language model that has been fine-tuned, using a curated catalog of categorized question training data, to categorize questions into categories, and the fine-tuned language model is trained to generate the category of an input question without comparing a vector embedding of the question to a vector embedding of the category.

5. The system of claim 1, wherein providing the detected question to the identified target via the question provision interface includes one or more of the following: displaying the detected question in a graphical user interface (GUI), indicating a source of the detected question, providing a timestamp of the detected question with respect to the obtained transcript, enabling the identified target of the detected question to view a portion of the obtained transcript associated with the detected question, indicating the determined category of the detected question, and providing a plurality of questions to the identified target of the detected question.

6. The system of claim 1, wherein identifying the target of the detected question using the determined category includes:
   determining a department associated with the determined category; and
   identifying a member of the determined department as the target of the detected question.

7. The system of claim 1, wherein the memory and the computer program code are configured to cause the processor to:
   obtain a category question catalog associated with the determined category prior to obtaining the transcript associated with the meeting, wherein the obtained category question catalog includes a plurality of example category questions;
   generate, using the question clustering model, a plurality of category question vector embeddings from the plurality of example category questions of the obtained category question catalog;
   generate a category vector embedding associated with the category using the generated plurality of category question vector embeddings; and
   include the generated category vector embedding in the plurality of category vector embeddings used by the question clustering model.

8. The system of claim 1, wherein determining, by the question clustering model, the category of the detected question using the generated question vector embedding and a plurality of category vector embeddings includes:
   comparing the generated question vector embedding to each category vector embedding of the plurality of category vector embeddings using cosine similarity;
   determining a category vector embedding of the plurality of category vector embeddings that is most similar to the generated question vector embedding; and
   assigning a category of the determined category vector embedding as the category of the detected question.

9. A computerized method comprising:
   obtaining a transcript;
   detecting, by a question detection model, a plurality of questions in the obtained transcript;
   filtering the plurality of questions using a question relevance filter;
   generating, using a question clustering model, a question vector embedding of a selected question of the filtered plurality of questions;
   determining, by the question clustering model, a category of the selected question using the generated question vector embedding wherein question vector embeddings having similar semantic meanings are located in similar regions in an n-dimensional space;
   comparing the category of the detected question to a plurality of category vector embeddings and determining a closest matching category;
   identifying a target of the selected question using the determined closest matching category; and
   providing the selected question to the identified target via a question provision interface.

10. The computerized method of claim 9, further comprising:
   generating, using the question clustering model, a plurality of question vector embeddings of the filtered plurality of questions, wherein the generated question vector embedding of the selected question is part of the generated plurality of question vector embeddings of the filtered plurality of questions;
   determining, by the question clustering model, a plurality of categories of the filtered plurality of questions using the generated plurality of question vector embeddings and the plurality of category vector embeddings;
   identifying a plurality of targets of the filtered plurality of questions using the determined plurality of categories; and
   providing the filtered plurality of questions to the identified plurality of targets via the question provision interface.

11. The computerized method of claim 9, wherein the question relevance filter includes filtering logic for removing questions from the detected plurality of questions that include only words that are present on a list of stop words.

12. The computerized method of claim 9, wherein detecting the plurality of questions in the obtained transcript includes detecting an identity of a speaker who asked the selected question; and
   wherein identifying the target of the selected question includes identifying the target of the selected question using the detected identity of the speaker.

13. The computerized method of claim 9, wherein providing the selected question to the identified target via the question provision interface includes one or more of the following: displaying the selected question in a graphical user interface (GUI), indicating a source of the selected question, providing a timestamp of the selected question with respect to the obtained transcript, enabling the identified target of the selected question to view a portion of the obtained transcript associated with the selected question, indicating the determined category of the selected question, and providing a plurality of questions to the identified target of the selected question.

14. The computerized method of claim 9, wherein identifying the target of the selected question using the determined category includes:
   determining a department associated with the determined category; and
   identifying a member of the determined department as the target of the selected question.

15. The computerized method of claim 9, further comprising:
   obtain a category question catalog associated with the determined category prior to obtaining the transcript, wherein the obtained category question catalog includes a plurality of example category questions;

generate, using the question clustering model, a plurality of category question vector embeddings from the plurality of example category questions of the obtained category question catalog;

generate a category vector embedding associated with the category using the generated plurality of category question vector embeddings; and include the generated category vector embedding in the plurality of category vector embeddings used by the question clustering model.

16. The computerized method of claim 9, wherein determining, by the question clustering model, the category of the detected question using the generated question vector embedding and a plurality of category vector embeddings includes:

comparing the generated question vector embedding to each category vector embedding of the plurality of category vector embeddings using cosine similarity;

determining a category vector embedding of the plurality of category vector embeddings that is most similar to the generated question vector embedding; and assigning a category of the determined category vector embedding as the category of the detected question.

17. A computer storage medium has computer-executable instructions that, upon execution by a processor, cause the processor to at least:

obtain a transcript associated with a meeting;

detect, by a question detection model, a question in the obtained transcript;

generate, using a question clustering model, a question vector embedding of the detected question;

determine, by the question clustering model, a category of the detected question using the generated question vector embeddings wherein question vector embeddings having similar semantic meanings are located in similar regions in an n-dimensional space;

compare the category of the detected question to a plurality of category vector embeddings and determine a closest matching category;

identify a target of the detected question using the determined closest matching category; and provide the detected question to the identified target via a question provision interface.

18. The computer storage medium of claim 17, wherein the question clustering model includes a language model that has been fine-tuned, using a curated catalog of categorized question training data, to categorize questions into categories, and the fine-tuned language model is trained to generate the assigned category of an input question without comparing a vector embedding of the question to a vector embedding of the category.

19. The computer storage medium of claim 17, wherein the computer-executable instructions, upon execution by a processor, further cause the processor to at least:

detect, by the question detection model, a plurality of questions in the obtained transcript, wherein the detected question is part of the detected plurality of questions;

filter the plurality of questions using a question relevance filter;

generate, using the question clustering model, a plurality of question vector embeddings of the filtered plurality of questions, wherein the generated question vector embedding of the detected question is part of the generated plurality of question vector embeddings of the filtered plurality of questions;

determine, by the question clustering model, a plurality of categories of the filtered plurality of questions using the generated plurality of question vector embeddings and the plurality of category vector embeddings;

identify a plurality of targets of the filtered plurality of questions using the determined plurality of categories; and provide the filtered plurality of questions to the identified plurality of targets via the question provision interface.

20. The computer storage medium of claim 17, wherein determining, by the question clustering model, the category of the detected question using the generated question vector embedding and the plurality of category vector embeddings includes:

comparing the generated question vector embedding to each category vector embedding of the plurality of category vector embeddings using cosine similarity;

determining a category vector embedding of the plurality of category vector embeddings that is most similar to the generated question vector embedding; and assigning a category of the determined category vector embedding as the category of the detected question.

* * * * *